Jan. 3, 1928.　　　　　　　　　　　　　　　　1,655,219
R. CARLSTEDT
REGULATOR
Filed June 9, 1924　　　3 Sheets-Sheet 1
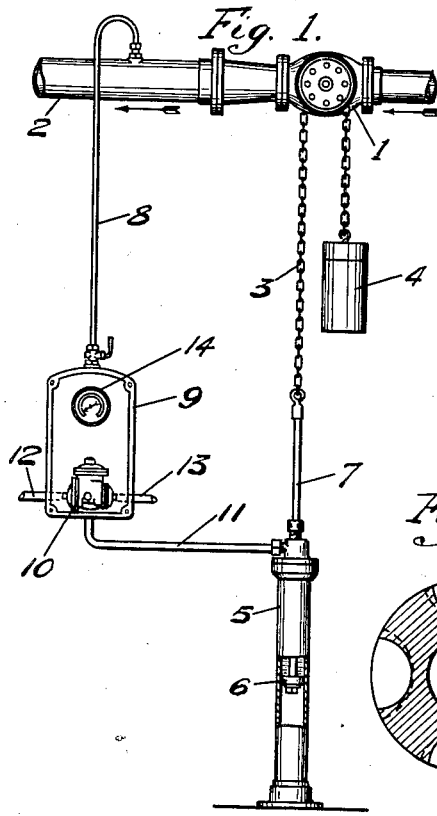
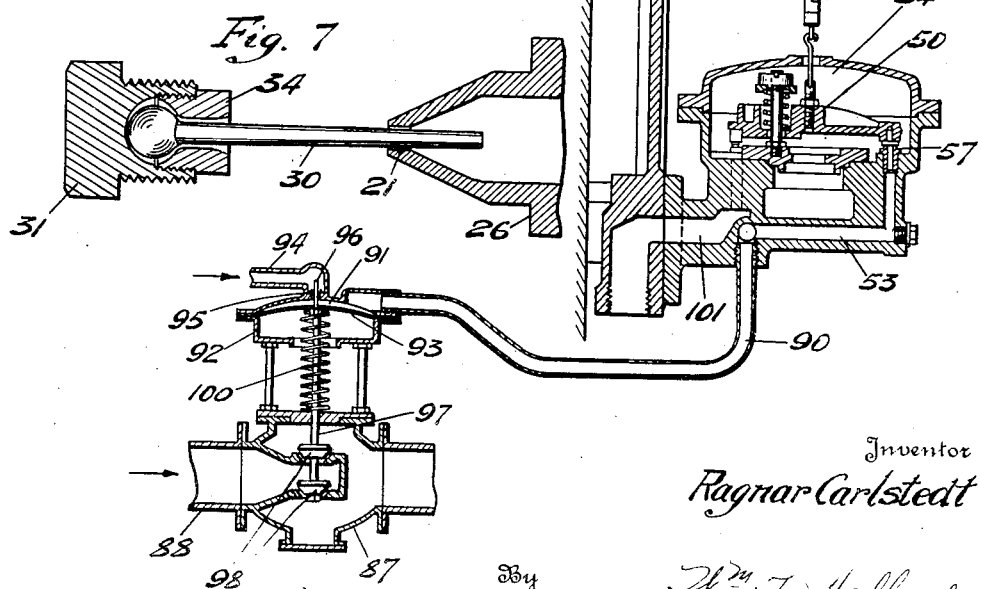
Inventor
Ragnar Carlstedt
By
Wm T Hedlund
his Attorney Jan. 3, 1928. 1,655,219
R. CARLSTEDT
REGULATOR
Filed June 9, 1924  3 Sheets-Sheet 2
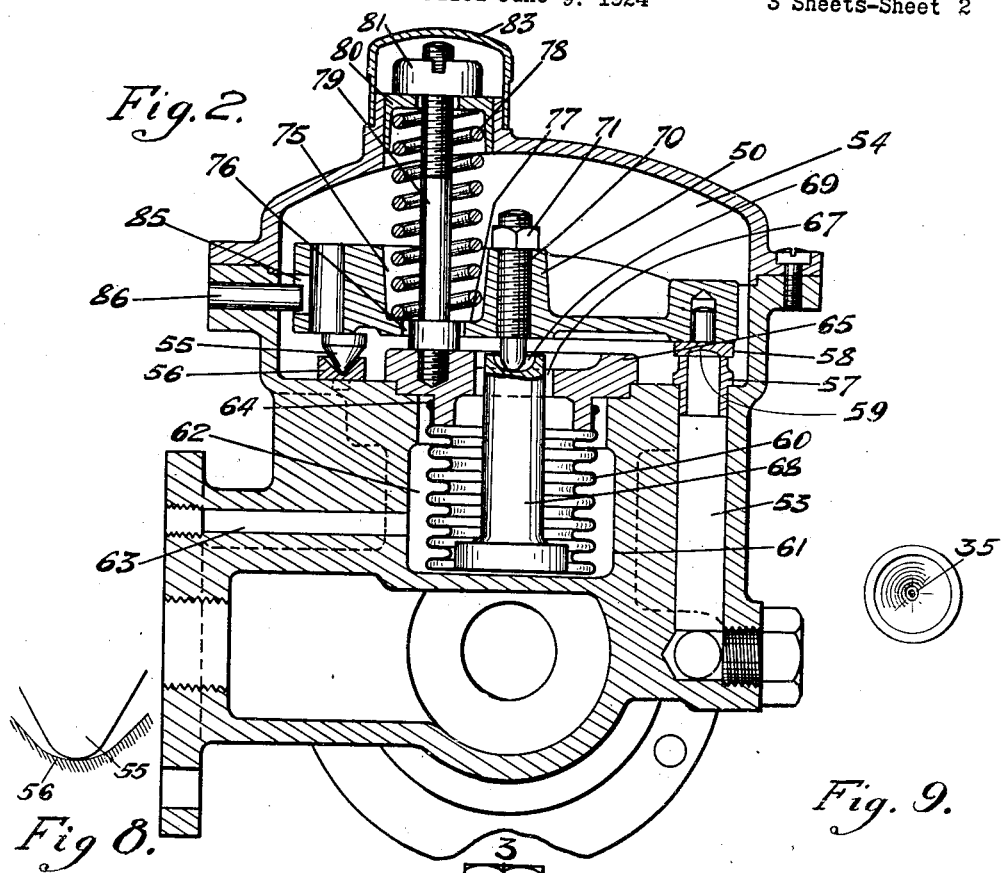
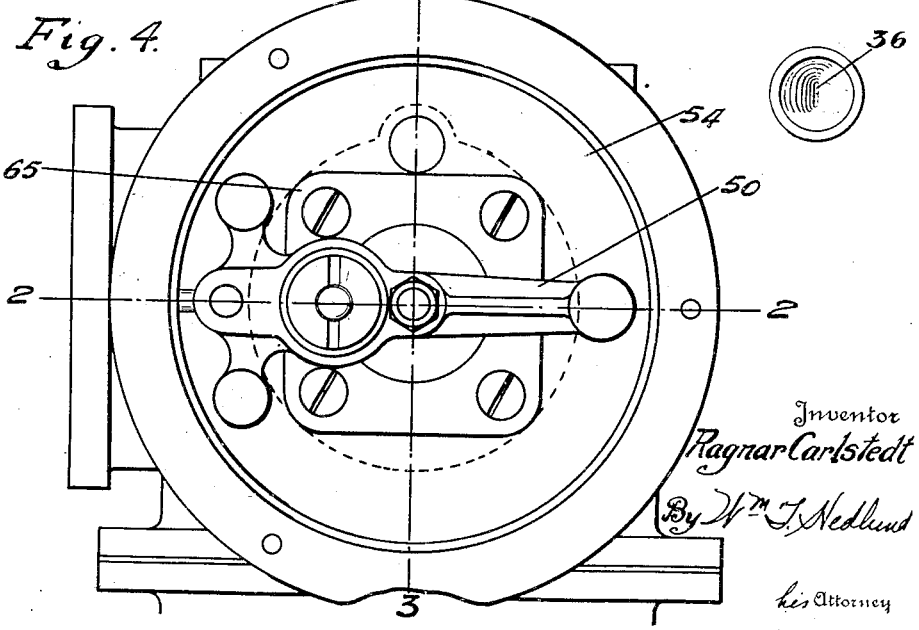
Inventor
Ragnar Carlstedt
By Wm. J. Nedlund
his Attorney Jan. 3, 1928.

R. CARLSTEDT 1,655,219

REGULATOR

Filed June 9, 1924

3 Sheets-Sheet 3

Inventor
Ragnar Carlstedt
By Wm J. Nedlund
his Attorney

Patented Jan. 3, 1928.

1,655,219

UNITED STATES PATENT OFFICE.

RAGNAR CARLSTEDT, OF STOCKHOLM, SWEDEN, ASSIGNOR TO ARCA REGULATORS, INCORPORATED, OF NEW YORK, N. Y., A CORPORATION OF VIRGINIA.

REGULATOR.

Application filed June 9, 1924. Serial No. 719,022.

This application is to be considered as relating back to my copending applications Ser. No. 422,223 filed February 3, 1921; Ser. No. 636,947 filed May 5, 1923 and Ser. No. 640,127 filed May 19, 1923 respectively for all common subject matter.

My invention relates to regulators of the type wherein a continuous jet of fluid, preferably liquid, is suppressed more or less by an agent movable in response to impulses in the medium to be controlled, the suppression of the jet being utilized to indirectly control a main control member. More specifically my invention relates to certain organs of control used in regulators of this type and embraces an improved relay and also an organ combining a relay lever and a pilot valve into one compact unit which I term a "pilot-relay".

One object of my invention is to provide a regulator of extreme sensitiveness. This is in part accomplished by the provision of a relay lever which is supported and operates in an entirely frictionless manner. A regulator according to my invention is of remarkable sensitiveness and accuracy and yet contains no delicate parts of any kind or any mechanism which is likely to get out of order.

Further objects of my invention are to produce a relay construction for regulators of the above type which is unaffected by impurities in liquid used, this being accomplished by an automatic filtering device embodied in the regulator itself; further, a regulator which is reliable, needing a minimum of attention; and a regulator which is easy to manufacture and is readily repaired.

My regulator has a remarkably wide field of application, and among other uses has been applied for controlling steam, air and water pressures, temperature, humidity, voltage, speed, the density of liquids, the adjustment of the electrodes of electric furnaces and the regulation of the flow of pulp in paper manufacture. The same regulator is applied for any of these duties. The variation of whatever physical property is being controlled is, in all cases, caused to act on a similar element in the regulator. The result of this is that the regulator is a standard article, an advantage of great commercial importance.

Other objects and advantages of my invention will be apparent as the description proceeds.

Figure 3:
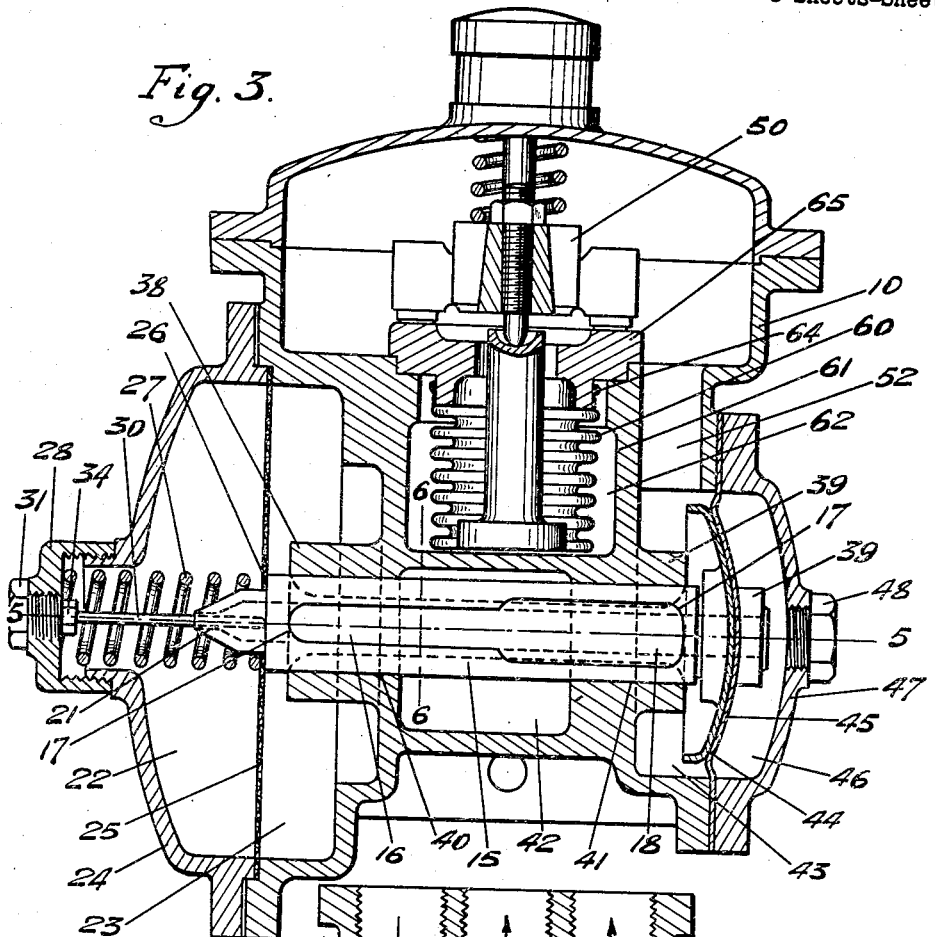
Figure 5:
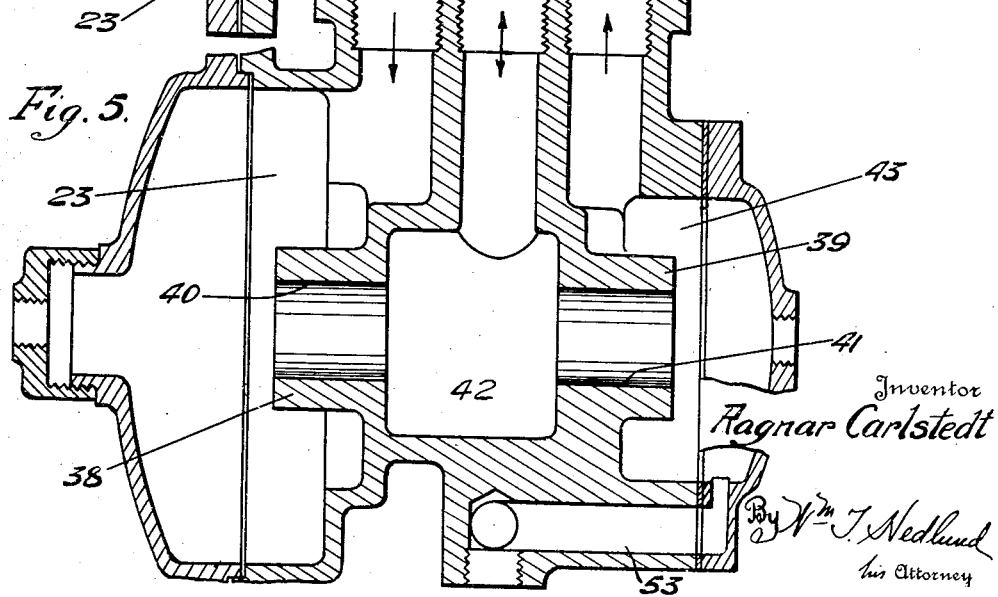

In the accompanying drawings which show preferred forms of my invention; Fig. 1 is an organization view showing one of the many applications of the regulator according to my invention; Fig. 2 is a vertical cross section of the preferred form of pilot-relay taken on the line 2—2 Fig. 4, and showing the bearing cup in section, parts being omitted; Fig. 3 is a vertical cross section of the pilot-relay taken on the line 3—3 Fig. 4; Fig. 4 is a top plan view of the pilot-relay with the top closure removed; Fig. 5 is a horizontal cross section of the relay taken on the line 5—5 Fig. 3 with parts omitted; Fig. 6 is a cross section taken through the pilot valve taken on line 6—6, Fig. 3; Fig. 7 is a detailed showing on an enlarged scale of the automatic cleaning and restricting mechanism; Figs. 8 and 9 show, on an enlarged scale, certain details of construction; Fig. 10 shows a simple relay applied to a temperature regulator.

Referring more particularly to Fig. 1, 2 designates a steam pipe and 1, a valve therein which I have chosen to illustrate as one form of main control member which my regulator is adapted to control. The valve is operated by means of a chain 3 passing over a sprocket wheel attached to the valve spindle. Attached to one end of the chain is a counter-weight 4. A pressure cylinder 5 contains a piston 6 movable therein and is operatively connected to a piston rod 7 which is attached to the other end of the chain 3. Liquid pressure in cylinder 5 moves the piston which in turn controls the position of the main control member 1. The pressure in cylinder 5 is controlled by means of my improved pilot-relay, designated by reference character 10, in a manner which will be set out in detail hereinafter. This relay is shown as mounted on a wall panel 9. Impulse transmitting tube 8 is connected with steam pipe 2 and passes down the back of the wall panel and is connected to a passageway in the relay whereby changes of pressure in steam pipe 2 are transmitted to the relay. The relay operating in response to the impulses in the medium to be controlled, in the instance shown, the pressure in steam pipe 2 controls the flow of a liquid under pressure through conduit 11 to or from the pressure cylinder 5, either connecting this pressure cylinder with a supply conduit 12 which may be connected, for example, to the ordinary city main; or connecting the pressure cylinder with a drain conduit 13. By means of this connection between pressure cylinder 5 and either a source of liquid under pressure or a place of discharge of relatively lower pressure the position of the piston 6 is changed and consequently the main control member 1 regulated. A pressure gauge 14 mounted on the wall panel 9 indicates the pressure in the tube 8 and consequently in the steam pipe 2.

The construction of the preferred form of the pilot-relay will now be explained, reference being had to Figs. 2-9. For purposes of description I term those parts of the relay which are stationary, a stationary housing. This housing consists principally of a main relay casting and three closure members. The relay comprises two major elements, a relay lever 50 and a pilot valve 15 both contained in the stationary housing. The relay lever is moved in response to impulses in the medium to be controlled and this relay lever in turn, indirectly through the intermediary of a pressure liquid, controls operation of the pilot valve, which in turn, indirectly through the intermediary of a pressure liquid, controls a servo-motor such as piston 6 shown in Fig. 1. This type of control is known as indirect-indirect. It is so called because there are two indirect agencies of control; first, between the relay lever and the pilot valve and second, between the pilot valve and the servo-motor. By this means of control, using as the indirect controlling agency liquid, preferably water, an extreme accuracy of control and an extreme sensitiveness is obtained.

In this indirect-indirect control the liquids of the two steps of force transmission may be the same or they may be different. They may come from a single source or from separate sources. Preferably, as in the embodiment described herein, the liquids are the same for the transmission of force from the relay to the pilot valve as from the pilot valve to the servo-motor.

The pilot valve 15 moves in cylindrical seats 40 and 41 formed in the main relay casting. These seats 40 and 41 are machined and constitute bearings for the pilot valve. These seats are formed in bosses 38 and 39 in the main casting which besides providing bearings for the pilot valve constitute boundary portions for a supply chamber, a discharge chamber and a central chamber hereinafter described.

The pilot valve is circular in section as shown in Fig. 6 and consists of a single piece of metal. Cut into the outer surface of the pilot valve are grooves 16. These grooves may be of any convenient number, the grooves extending with the pilot valve in mid position, from substantially the outer end of the cylindrical seat 40 to the outer end of cylindrical seat 41. Thus, in middle position, the grooves are blocked off by the seats, but, should the pilot valve be moved in either direction there will be a communication between the grooves and the chambers situated outside and between the bosses 38 and 39 in the casting. The grooves are rounded at the ends as indicated at 17. The purpose of this rounding is to prevent shocks in the flow of liquid into the grooves or from the same when liquid enters or leaves the grooves from or into the chambers to either side of the bosses containing the seats. This rounding of the groove ends is in two directions, both transversely of the groove and longitudinally of the groove thereby giving a greater opening as the groove moves beyond the seat and a smooth passageway for the liquid. The groove is preferably made larger at one end than at the other for reasons hereinafter set out.

Extending longitudinally throughout the whole length of the pilot valve and in the center thereof, is a longitudinal passageway 18. This passageway is restricted at one end as indicated at 21 and as shown in detail in Fig. 7. The end of the pilot valve having the restricted portion of the inner longitudinal passageway therein, is different in outer contour from the major portion of the pilot valve, being tapered down to the opening of the longitudinal passageway at this end. This forms a tapered cutting edge adjacent to the restricted portion of the longitudinal passageway. This tapered end of the pilot valve is further cut away to form a shelf 26.

Attached to the shelf 26 is a filter 25 consisting preferably of very fine copper mesh. Filter 25 is secured to the main relay casting and constitutes a separation between chamber 22, which I term a filter chamber, and chamber 23, which I term a supply chamber. The filter is clamped between the main relay casting and a filter chamber closure 24. The supply chamber 23 is connected as shown in Fig. 5 to a source of liquid under pressure, as for example, the supply conduit 12 of Fig. 1. Liquid enters this supply chamber 23 and separates therein into two streams, part passing into the grooves 16 of the pilot valve, at such times as the grooves extend beyond the seats 40 in the course of regulation; the rest passing through the filter, thence through the longitudinal passageway of the pilot valve and eventually to jet chamber 54, where it is controlled by the relay lever 50.

There is practically a continuous flow of liquid through the filter into the filter chamber and through the inner longitudinal passageway of the pilot valve. It is this continuous stream which is controlled by the relay lever and which, being controlled, in turn regulates the position of the pilot valve. It is essential that the liquid passing through the pilot valve be free from impurities. This is accomplished in part by filter 25. The filter, as above explained is attached at its center to the pilot valve but firmly secured at its periphery to the relay casting. The filter then has movements depending on the movements of the pilot valve. This is an important feature of my invention because by this movement I obtain automatic cleaning of the filter.

As above stated water is preferred as the liquid since it is cheap and always obtainable whereas special liquids are sometimes scarce. In practice I use water almost exclusively and, when water is used it is obvious that a filtering apparatus is particularly necessary. The liquid entering chamber 23 always has more or less impurities in it. Some of these impurities are such that they lodge on the filter 25, as the current of liquid passes through the filter on its way to the inner passage of the pilot valve. Now when the pilot valve has been moved so that the grooves 16 are in communication with chamber 23 there is a rush of liquid into these grooves on its way to the servo-motor. This rush of water carries the particles of impure substance deposited on the filter along with it over into the servo-motor and eventually to the drain conduit. These impurities do no harm in the servo-motor but would materially affect the operation of the regulator if they were allowed access into the restricted passageway 21. Furthermore, when the filter is moved to the left, as shown in Fig. 3, the filter chamber 22 being filled with water, there is a back wash by movement of the filter, which will cause a dislodgment of the foreign particles into the stream of liquid flowing into the grooves 16 to the servo-motor. Thus an automatic cleaning of the liquid is obtained by causing part of the liquid to pass through the filter while the remaining portion of the liquid is caused to flow past the filter along the surface thereof, this latter part of the liquid then leading away the impurities separated out by the filter and, at the same time as this remaining portion of the liquid is caused to flow past the filter, the filter is moved in the body of liquid in such a manner as to cause a back wash of liquid through the filter in opposite direction to the normal flow, whereby impurities left on the filter are forced off from the filter into the passing stream of cleaning liquid.

Resting on the shelf 26 and bearing against the pilot valve 15 and opposed to the liquid pressure in diaphragm chamber 46 at the opposite end of the pilot valve is a spring 27. This spring, together with the liquid pressure on the left hand end of the pilot valve, balances the normal pressure in chamber 46 for which the regulator is in equilibrium. The spring 27 bears against a cap 28. This cap 28 closes an opening in the filter chamber closure 24 and is threaded to the same whereby adjustment of the spring 27 may be accomplished.

Cleaning pin 30 is mounted in a pin retaining member 31 screwed into cap 28 and extends into the restricted opening 21 of the pilot valve. This pin has substantially no movement with respect to the relay casting but due to the movement of the pilot valve has movement relative to the restricted passageway. The object of this device is to clean the narrow passageway 21.

Despite the cleaning operation of the filter 25 there are certain impurities in water or other liquid employed which may pass through the filter regardless of how fine the mesh. For example, there may be salts in solution. These impurities which pass through the filter are liable to build up on the wall of the restricted passageway 21 and form a coating thereon, thereby clogging this passageway. The passageway 21 is a very essential part of the invention since it is due to this restriction that the movement of the relay lever 50 can cause pressure changes in chamber 46. As is readily apparent this restricted passageway must not become clogged up. By means of the movement of pin 30 relative to the passageway 21 a scouring of the walls of the passageway results which keeps this passageway clean and prevents the building up of foreign matter in the passageway, as for instance the growth of animal matter. This pin is preferably slightly tapered in direction toward the pilot valve as shown more clearly in Fig. 7.

Further, by a unique mounting, pin 30 is self centered with respect to the restricted passageway. This is accomplished by means of the ball and socket connection in the pin retaining member 31. The end of the pin in the pin retaining member is in the form of a ball which fits into a spherical socket in the retaining member formed between the main part of the retaining member and the retaining nut 34. The liquid passing between the pin and the wall of the restricted passageway will thus center the pin and it is assured that the pin will not rub against any particular side of the wall as might be the case if it were rigidly attached to the retaining member and were slightly out of alignment.

By means of the outside taper on the pilot valve at the restricted passageway a wedge like edge is formed where liquid enters the longitudinal passageway. This wedge like edge prevents the building up of impurities on the pilot-valve adjacent to the restricted opening since there is a continual rush of liquid past this point and the taper affords such a construction that there can be no still water or slow movement thereof at a point near the restricted opening such that a growth can build up and work its way over the end of the restricted passageway. It will thus be seen that by this construction of parts no special liquid need be used and that the sensitiveness of the regulator will not be impaired due to impurities in the liquid although the liquid used contains a relatively large amount of impurities. This makes the regulator adaptable to use in a great many places where it could not otherwise be used, as for example in places where the liquid contains a great quantity of salt solution. By this means the expense of a special liquid, such as oil, is saved and ordinary city water can be used.

Between the two seats 40 and 41 is a central chamber 42 connected with the servo-motor, as for example by means of a conduit 11 of Fig. 1. At the right hand end of the pilot valve as shown in Fig. 3 is a discharge chamber 43 which is connected to a drain such as conduit 13 of Fig. 1. This discharge chamber 43 is separated from diaphragm chamber 46 by means of diaphragm 45. Diaphragm 45 is secured to the pilot valve by means of nut 39 and is clamped between the relay casting and the diaphragm chamber closure 47, in which is a plug 48 giving access for inspection of the diaphragm and the longitudinal passageway 18. Diaphragm chamber 46 connects with passageway 53 as shown in Figs. 2 and 5 which leads to the jet chamber 54.

In this jet chamber is situated the sensitive relay lever 50 which is in the general form of a T. This lever is mounted on two points 55 bearing in cups 56. These points, together with the cups constitute in effect a knife edge bearing for the lever.

However the mountings are not made as points in the absolute sense of the word but are rounded and polished to a very small radius as shown on a very greatly enlarged scale in Fig. 8. If the mountings were tapered down absolutely to a point they would not stand up under the forces to which the lever is subjected. The cups in which the points bear are also rounded. The rounding of the cups is to a larger radius than the radius of rounding of the point. By this means when the lever is rocked about the pivot points, the points act as ball bearings in the cups, there being a very minute rolling action.

Fig. 9 shows the manner of construction of the cups in which the points bear. The dished part of one cup as indicated at 35 is conical with the bottom having a spheroidal surface of greater radius than the extreme ends of the points seating therein. The other cup has a longitudinal slot 36 therein which is also rounded at the bottom to a radius greater than the radius of the point seating in the slot. The slot is in longitudinal alignment with the conical bearing surface of the other cup. By this construction it is possible to avoid the necessity of extreme exactness in the making of the levers and the placing of the cups. It is obvious that if two conical dished bearing cups were used that an exactness of manufacture which is practically impossible would be necessary to mount the lever properly. Furthermore the arrangement including the slot allows for temperature changes and the consequent alterations in length of the cross piece of the T shaped lever.

The opposite end of the lever is provided with a baffle plate 58 which is posited over the opening in the nozzle 57 at the outlet end of passageway 53. This baffle plate has a substantially flat surface adapted to contact with the upper surface of the nozzle 57, were there no liquid issuing out of the nozzle, so as to make a tight closure. The baffle plate is, however, dished in the middle as indicated at 59 where it is not adapted to contact with the upper surface of the nozzle, thus obviating the necessity of scraping the whole baffle plate to make the necessary fit. This saves materially the cost of manufacture of this part. By making the baffle plate and nozzle as shown so that the direction of flow of liquid through the nozzle is perpendicular to the baffle plate and the baffle plate surface is plane, the maximum flow of liquid through the nozzle is obtained for a minimum movement of the lever, thus making for increased sensitiveness. The distance which the baffle plate is posited away from the end of the nozzle in normal operation is very small. Minute changes in movement of the lever cause accurate and definite changes of pressure in the diaphragm chamber 46.

The lever may be moved by any means operating in response to changes in the medium to be controlled. For purposes of illustration, in the figures under consideration, I have shown the movement of the lever as responsive to changes in pressure operating upon a bellows 60. This bellows is situated in a recess 61 and a pressure chamber 62 is formed between the bellows and the recess. This pressure chamber is connected by means of passageway 63 with whatever is to be controlled as, for example, by means of the impulse transmitting tube 8 of Fig. 1, to the steam line 2. The bellows 60 is a solid copper spinning and forms a sensitive member which increases or decreases in length or in other words, expands or contracts in terms of the pressure acting in chamber 62, which is the pressure to be controlled. The bellows is connected to recess closure 65 by soldering indicated at 64. This recess closure has an opening 67 through the same and extending through this opening and situated in the bellows is a stud 68 having an upset enlarged lower end resting on the bottom of the bellows. This stud serves to transmit movement of the bellows to the relay lever 50 through the central pin 70 which is secured to the lever by threads and by jam-nut 71. Central pin 70 rests in a pocket 69 in the upper part of the stud 68. It will thus be seen that there is no frictional movement between the bellows and the lever. Further by means of the loose contact between stud 68 and pin 70 a large extension of the bellows cannot exert a force on the lever tending to deform the same, injure the points or other parts as the stud then separates from the central pin. No deformation or stress of parts occurs when the bellows is contracted since there are no stops to limit the movement of the lever, the only opposing action being the spring 78 and the stream of liquid through the nozzle. The bellows, the recess closure 65 and the stud 68 form a unit which is assembled by first placing the stud inside the bellows then placing the recess closure in contact with the bellows by allowing the stud to extend through the opening 67 and then soldering the bellows to the recess closure.

It is to be noted that the pressure acts outside the bellows. By this means the bellows will not be liable to an extension beyond its elastic limit as often happens with bellows subjected to pressure inside them. After the pressure has risen to a value sufficient to compress the bellows so that the corrugations of the wall are in contact a further increase of pressure can do the bellows no harm. Furthermore by thus arranging the bellows so that the pressure acts on the outside, the soldering is under compression which is an advantage over soldering under tension which latter when stressed is easily strained and disrupted.

In the relay lever is a well 75 for the reception of spring 78. This well has tapered walls so that friction between the spring and the wall is eliminated. Associated with the well at the bottom part thereof, is an opening 76. This opening 76 together with the well form a passageway through the lever in which is a stud bolt 79 which is screwed into the recess closure. The well 75 and the opening 76 are so arranged as to form a seat 77 on which the spring 78 rests. The spring is held by a spring cup 80 in turn secured by a nut 81 screwed onto the stud bolt 79. Spring cup 80 also has tapered inside walls to prevent frictional contact of the spring with the same. The nut 81 serves to adjust the tension of the spring 79 and is inclosed by cap 83.

At the bearing end of the lever is a recess 85 into which a retaining lug 86 extends. The purpose of this lug is to prevent the pressure acting on bellows 60 from lifting the lever 50 off the point bearings 55 to dislodge the same.

The spring 78 acts on the lever at a point between the point of application of the impulse transmitting force, that is the central pin 71, and the point bearings 55. By this means the points are held to their seats upon a rise of the right hand end of the lever as shown in Fig. 2 so that under ordinary conditions the lug 86 does not need to come into use.

A passageway 52 connects jet chamber 54 with discharge chamber 43 so that the liquid spraying out through nozzle 57 into chamber 54 can leave the same and pass to drain.

The operation of the device is as follows:

Suppose, for example, the pressure rises in chamber 62. The bellows is then caused to contract more or less and stud 68 moves the lever 50 in counter-clock wise direction against the action of spring 78. This increases the distance between the baffle plate 58 and the orifice of the nozzle 57 thus increasing the jet flow. This increased jet flow causes a decrease of pressure in passageway 53 and consequently in diaphragm chamber 46, since more liquid then passes out of the nozzle than flows in through restricted passageway 21. This decrease in pressure in chamber 46 causes a movement of the pilot valve 15 to the right as shown in Fig. 3 due to the preponderance of the force exerted by spring 27 over the pressure in the diaphragm chamber 46. Movement of the pilot valve to the right affords communication through grooves 16 between central chamber 42 connecting with the servo-motor and discharge chamber 43. The liquid in the servo-motor is thus allowed to pass out through the drain conduit and the servo-motor is operated in such a manner that the pressure in the bellows chamber 62 is decreased. For example, in Fig. 1, the water will be forced out of the pressure cylinder through conduit 11 due to the preponderance of force exerted by the counter weight 4 and valve 1 will be closed, thereby decreasing the pressure behind the same, which in turn, acting through impulse transmitting tube 8 decreases the pressure in chamber 62, thus leading the pilot valve towards its previous position.

On the other hand, should the pressure in chamber 62 decrease, the jet of liquid issuing from nozzle 57 would be decreased and the pressure built up in diaphragm chamber 46 moves the pilot valve to the left as shown in Fig. 3 and effects communication between supply chamber 23 and central chamber 42 through grooves 16, thus allowing liquid under pressure to pass to the servo-motor to effect the necessary regulation. As has been stated the grooves 16 are wider at the discharge chamber end of the pilot valve than at the supply chamber end. This is done to equalize for the relative differences in pressure between, first, the supply chamber and the central chamber and, secondly, between the central chamber and the discharge chamber. There is a greater difference of pressure between the first than the second and consequently a less cross-sectional area of flow is necessary to give equal effects in operation.

In this operation spring 27 acts as a compensating device to prevent over regulation, since the farther the pilot valve is moved toward the left the greater the force exerted thereon by spring 27. This compensating feature is very important since it prevents hunting which is a condition necessary to be guarded against in all regulators. Separate means are usually employed for this purpose, usually in the form of mechanical connections which serve to bring the pilot valve back upon movement of the main control member, but by anticipating over-travel of the parts as I do by my arrangement a more sensitive regulation is obtained than by extraneous compensating parts. Furthermore, as the pilot valve moves toward the left, the passageway between the wall of the restricted passage 21 and the pin 30, becomes smaller, thus serving to slightly decrease the pressure in chamber 46 and bring the pilot valve to a stop sooner than it otherwise would.

By this arrangement of spring 78, as shown, this also acts as a compensator, since the force of the spring increases the farther the baffle plate is moved away from the nozzle.

As will be noticed there are no parts associated with the relay lever which have any frictional contact and as the lever is the primary impulse receiver it is very sensitive to changes in the condition which is to be controlled and an extremely sensitive regulation is assured.

The regulator can be adjusted by adjustment of springs 27 and 78 by turning cap 28 or nut 81.

The regulator according to my invention is independent of variations in pressure in the supply liquid. This is due to the balancing liquid forces on the two ends of the pilot valve and the rate of transmission of a force within a liquid which is practically instantaneous.

As is obvious upon consideration of the operation and construction of the device, it is possible to separate the pilot-relay into two parts, one comprising the lever 50 and the parts connected therewith and the other comprising the pilot valve and the parts connected therewith. This might be desirable in some cases to save piping where the parts of the regulating mechanism are at some distance from each other.

Upon cursory consideration it might be thought that my regulator is not efficient because of the continuous use of liquid, for example, a continuous drainage of water. However the regulator uses but little water, the amount being about five to ten gallons an hour. This use of water is inconsequential compared to the results obtained.

With certain uses of my invention I find that the regulator may be controlled without a pilot valve, in which case the regulation is indirect rather than indirect-indirect, as previously described. In such a device the continuously flowing stream of liquid is the primary actuating agent for that which is to be controlled. Such an embodiment is shown in Fig. 10. In this embodiment a valve 87 controlling, for example, steam line 88 is operated in response to temperature. Variations in temperature causes variations in length of a strip of ebonite 89 or the like which variations control lever 50, which in turn, in a manner similar to that above described controls a continuously flowing stream of liquid passing through nozzle 57 at the end of passageway 53. Passageway 53 connects with conduit 90 leading to diaphragm chamber 91 in servo-motor 92 and formed between the casing of the servo-motor and a diaphragm 93. Supply pipe 94 leads water or other liquid to the diaphragm chamber 91 through restricted passageway 95 corresponding to restricted passageway 21. Pin 96 extends through the restricted passageway 95 and is attached to diaphragm 93 and operates upon movement of the diaphragm to clean the restricted passageway in a manner similar to that previously set forth. To the diaphragm is attached valve spindle 97 which is attached to valve discs 98. Spring 100 acts against diaphragm 93 in opposition to the force exerted by the pressure liquid in chamber 91. 101 designates a drain conduit leading from jet chamber 54. 99 designates an adjusting screw for the purpose of regulation.

The operation of the device is as follows:—

A decrease of temperature contracts the ebonite strip 89, thus causing a movement of the lever 50 to increase the flow through nozzle 57. This increase of jet flow causes a decrease of pressure in passageway 53, conduit 90 and chamber 91. Decrease in pressure in chamber 91 causes a movement of the valve spindle 97 upwardly which increases the flow through valve 87, thus, for example, increasing the flow of steam or other heating medium to effect an increase of temperature to restore the seat of balance.

On the other hand, should the temperature increase, ebonite strip 89 expands thereby suppressing the flow through nozzle 57, which increases the pressure in chamber 91, thereby overcoming the force of spring 100 and closing the valve.

It is obvious that various changes in construction and arrangement of parts may be made without departing from the invention.

While I have stated that liquid is preferred as the operating fluid, it will be apparent that, in cases where a lag in operation is actually desired or is not detrimental to the regulating operation, that a gas may be used and, while the first described embodiment is especially adapted to the use of the liquid, some features of my invention, such as the relay lever and associated parts, may be used in conjunction with gas operated regulators with advantages, and, to such extent, my invention is not to be deemed limited to liquid pressure operation.

Having thus described my invention, what I claim is:

1. In a regulator, the combination with a conduit having an outlet for discharging a continuously flowing stream of fluid, of a rigid lever arranged to control the flow from said outlet and to vary the pressure in said stream, a point bearing pivotally supporting said lever, means for exerting a variable force against said lever and an element responsive to an impulse transmitting agent to move said lever.

2. In a regulator, a rigid pivotally supported lever, a conduit having an outlet discharging a continuously flowing stream of fluid in one direction against said lever, the lever being arranged to vary the pressure in said stream resilient means exerting a variable force biasing said lever in the opposite direction, means responsive to an impulse transmitting agent for determining the position of said lever and control mechanism actuated by variations in pressure of said stream.

3. In a regulator, a lever, a point pivot supporting said lever at one end, a baffle plate at the opposite end of said lever, an element actuated by an impulse transmitting agent acting on said lever intermediate its ends and a spring acting on said lever in opposition to said element at a point intermediate said pivot and said element.

4. A rigid lever for regulators, a point pivot for said lever, means causing a stream of fluid to issue against said lever, a spring acting on said lever, the lever being arranged to vary the pressure in said stream, and an impulse transmitting element acting on said lever in opposition to said spring and regulating mechanism actuated by variations of pressure in said stream.

5. In a regulator, a fixed point pivot support, a movable support, a rigid lever, means for causing a stream of fluid to issue against said lever, said lever being arranged to cause variations of pressure in said stream, and a spring intermediate said supports for holding said lever thereagainst.

6. In a regulator, a fixed point pivot support, an impulse transmitting element forming a movable support, a rigid lever, means for causing a stream of fluid to issue against said lever, said lever being arranged to cause variations of pressure in said stream, a point pivot on said lever resting on said fixed support, an adjustable pin mounted in said lever and resting on said movable support, and a spring holding said pivot and pin against their respective supports.

7. In a regulator, the combination with a conduit having an outlet for discharging a continuously flowing stream of fluid, of a pivotally supported rigid lever having a portion disposed over said outlet and arranged to vary the pressure of said stream, an impulse transmitting element for actuating said lever, means for exerting a variable force against said lever opposed to the effect of said impulse transmitting element, an adjustable connection between said element and lever and mechanism actuated by variations of pressure in said stream.

8. In a regulator, the combination with a conduit having an outlet for discharging a continuously flowing stream of liquid, of a rigid lever having a portion disposed over said outlet and arranged to vary the pressure in said stream, three triangularly disposed supports forming bearings, one being fixed in the plane determined by the three supports, and the remaining bearings permitting movement between said lever and supports in the said plane, means for exerting a variable force against said lever and mechanism actuated by variations of pressure in said stream.

9. In a regulator, the combination with means for producing a continuously flowing stream of liquid, of a rigid lever to vary the pressure of said stream, a pivot bearing for said lever, and means acting on said lever on opposite sides of said bearing to prevent displacement of the latter, the last mentioned means comprising a spring arranged to exert a variable force against said lever.

10. In a regulator, the combination with means for producing a continuously flowing stream of fluid, of a lever to control said stream, a well in said lever having a tapered wall, and a spring arranged to react against said lever and seated in said well.

11. In a regulator, the combination with means for producing a continuously flowing stream of liquid, of a rigid lever arranged to vary the pressure of said stream, a point pivot for said lever, means for exerting a variable force against said lever, a pilot valve arranged to be moved in accordance with variations of pressure in said stream having a passageway extending through the same through which said liquid continuously flows, a restriction in said passageway and a pin movable with clearance in said restriction.

12. In a regulator, a rigid lever, means to cause a stream of fluid to issue against said lever, a point pivot for said lever, means for exerting a variable force against said lever, a housing forming a pair of chambers, a pilot valve movable in accordance with variations of pressure in said stream located between said chambers, said valve having a passageway extending therethrough connecting said chambers, means for causing a continuously flowing stream of liquid to pass through said chambers and passageway, said passageway having a restricted portion therein and a pin movable with clearance in said restriction.

13. In a regulator, a housing forming a pair of chambers, a longitudinally movable pilot valve located between said chamber, said valve having a longitudinal passageway extending therethrough connecting said chambers, a restriction in said passageway, a pin mounted in said housing and extending through said restriction, and means for causing a continuously flowing stream of liquid to pass through said chambers and passageway.

14. A pilot valve comprising a central passageway extending longitudinally entirely through the valve having a restriction within the same and a plurality of grooves on the outside of the same, said grooves terminating short of the ends of the valve.

15. In a regulator, a housing forming a pair of bearings, a pilot valve located therein and extending beyond said bearings, a longitudinal passageway extending entirely through said valve, and a plurality of grooves on the outside of the valve, said grooves having a length equal to the overall length of said bearings.

16. In a regulator, a housing forming a pair of bearings, a pilot valve located therein and a plurality of grooves on the outside of said valve forming passages between said valve and bearings, the groove portions located in one bearing being of greater sectional area than the grooves in the other bearing.

17. A regulator comprising a supply chamber, a discharge chamber, and a third chamber, a pilot valve forming a passageway connecting the supply chamber with the third chamber at some time and at other times forming a passageway connecting the third chamber with the discharge chamber, a passageway extending through said valve, means for producing a continuously flowing stream of liquid through said passageway and means controlling said stream to actuate said valve.

18. In a regulator, a pilot valve comprising a supply chamber, means supplying liquid under constant pressure to said chamber, and a pilot valve forming a plurality of passages leading from said chamber, one of said passages being in communication with said chamber in all positions of the valve, and the remainder of said passages being in communication with said chamber only in some positions of the valve and means responsive to variations in pressure of a continuously flowing stream of fluid to actuate the pilot valve.

19. In a regulator, a supply chamber, means supplying liquid under constant pressure to said supply chamber, a liquid operated servo-motor, a pilot valve adapted to open and close communication between said chamber and said motor, a passageway providing a continuously flowing stream of liquid from said chamber, means to vary the flow of said liquid, and means responsive to variations in said flow to actuate said valve.

20. A lever for regulators of the type described, point bearings at one end of said lever constituting a pivot for the same, a baffle plate at the opposite end of said lever, means associated with said lever adapted to co-operate with an impulse transmitting agent, and a spring adapted to bear on said lever at a point intermediate said means and said point bearings.

21. A rigid lever for regulators, a point pivot for said lever, means causing a stream of liquid to issue against said lever, the lever being arranged to cause variations of pressure in said stream, a spring acting on said lever intermediate said stream of liquid and said pivot and control mechanism actuated by variations of pressure in said stream.

22. A rigid lever for regulators, a point pivot for said lever, means causing a stream of fluid to issue against said lever, the lever being arranged to cause variations of pressure in said stream, a spring acting on said lever and means associated with said lever adapted to cooperate with an impulse transmitting agent and control mechanism actuated by variations of pressure in said stream.

23. In a regulator, the combination with means for producing a continuously flowing stream of liquid, of a lever to control the same, a recess in said lever, a housing, a retaining lug secured to said housing and extending into said recess.

24. In a regulator, the combination with means for producing a continuously flowing stream of liquid, of a rigid lever to control the same, a point pivot bearing for said lever, means for exerting a variable force against said lever, a pilot valve controlled by said stream, said pilot valve comprising a passageway therein arranged for flow of said stream therethrough and a restricted portion in said passageway.

25. A relay for regulators comprising a stationary housing, means for producing a continuously flowing stream of liquid, means to control said stream of liquid, a pilot valve controlled by said stream of liquid, a filter connected to one end of said pilot valve and connected to said housing, and a diaphragm connected to the other end of said pilot valve and connected to said housing.

26. In a regulator, the combination with means for producing a continuously flowing stream of liquid and means to control the same, a pilot valve controlled by said stream of liquid and having a restricted passageway therein and a pin movable in said restricted passageway to clean the same.

27. In a regulator, in combination, a main control member, a servomotor to actuate the main control member, a movable baffle plate sensitive to changes in the medium to be controlled, a nozzle for discharging a continuous stream of liquid against said baffle plate, the baffle plate and nozzle being so arranged that the movement of the baffle plate varies the discharge through said nozzle, a filter arranged in the path of liquid to said nozzle and a means to move said filter in accordance with changes of pressure in said continuous stream.

28. In a regulator, in combination, a main control member, a servomotor to actuate the main control member, a movable baffle plate sensitive to changes in the medium to be controlled, a nozzle for discharging a continuous stream of liquid against said baffle plate, the baffle plate and nozzle being so arranged that the movement of the baffle plate varies the discharge through said nozzle, a filter arranged in the path of liquid to said nozzle and a means to move said filter in accordance with changes of pressure in said continuous stream, and means to pass liquid alongside said filter to said servomotor.

29. In a regulator, in combination, a main control member, a servomotor to actuate the main control member, a movable baffle plate sensitive to changes in the medium to be controlled, a nozzle for discharging liquid against said baffle plate, and so arranged that the movement of the baffle plate varies the discharge through said nozzle, a diaphragm actuated by the flow through said nozzle, a filter arranged in the path of liquid to said nozzle, and moved in accordance with movements of said diaphragm.

30. In a regulator, in combination, a main control member, a liquid pressure operated servomotor to actuate the main control member, a movable baffle plate sensitive to changes in the medium to be controlled, a nozzle for discharging a continuous stream of liquid against said baffle plate, and so arranged that the movement of the baffle plate varies the discharge through said nozzle, a diaphragm actuated by the flow through said nozzle, a filter arranged in the path of liquid to said nozzle, and moved in accordance with movements of said diaphragm, and means to pass liquid past said filter to said servomotor.

31. A regulator comprising a rigid lever, a point pivot for said lever, means to discharge a stream of fluid against said lever, said lever being arranged to cause variations of pressure in said stream, means for exerting a variable force against said lever, a pilot valve actuated by variations of pressure in said stream and having a supply chamber, a discharge chamber, and a third chamber adapted for connection with a servomotor, means to form a passageway connecting the supply chamber with the third chamber at some time, means to form a passageway connecting the third chamber with the discharge chamber at other times, the first passageway having a cross section smaller than that of the second passageway and automatic means responsive to variations in pressure of a continuously flowing stream of fluid to actuate the pilot valve.

32. A relay for regulators comprising a stationary housing, a supply chamber, a discharge chamber, a central chamber adapted for connection with a member to be controlled, an opening between said supply chamber and said central chamber, an opening between said discharge chamber and said central chamber, a pilot valve extending thru said openings, said openings constituting seats for said pilot valve, grooves in said pilot valve adapted to effect communication between the supply chamber and the central chamber upon movement of the pilot valve in one direction and to effect communication between said central chamber and said discharge chamber upon movement of the pilot valve in the opposite direction, a filter chamber, a filter between said filter chamber and said supply chamber, said filter being attached to said pilot valve and attached to said stationary housing, a diaphragm chamber, a diaphragm separating said discharge chamber from said diaphragm chamber, said diaphragm being secured to said pilot valve and secured to said stationary housing, a longitudinal passageway extending thru said pilot valve to connect said filter chamber with said diaphragm chamber, a restricted portion in said passageway, a pin secured to said stationary housing and extending into said restricted portion of the passageway, a spring acting between said housing and said pilot valve, a jet chamber, a passageway connecting said diaphragm chamber with said jet chamber, a lever in said jet chamber to control flow of liquid through the last mentioned passageway, point bearings for said lever acting between said lever and said stationary housing, a central pin in said lever, a stud adapted to move said central pin, a bellows, said stud being situated within said bellows, a recess, a pressure chamber formed between the walls of said recess and said bellows and a passageway connecting said jet chamber with said discharge chamber.

33. A relay for regulators comprising a stationary housing, a supply chamber, a discharge chamber, a central chamber adapted for connection with a member to be controlled, an opening between said supply chamber and said central chamber, an opening between said discharge chamber and said central chamber, a pilot valve extending through said openings, said openings constituting seats for said pilot valve, grooves in said pilot valve adapted to effect communication between the supply chamber and the central chamber upon movement of the pilot valve in one direction and to effect communication between said central chamber and said discharge chamber upon movement of the pilot valve in the opposite direction, a filter chamber, a filter between said filter chamber and said supply chamber, said filter being attached to said pilot valve and attached to said stationary housing, a diaphragm chamber, a diaphragm separating said discharge chamber from said diaphragm chamber, said diaphragm being secured to said pilot valve and secured to said stationary housing, a longitudinal passageway extending thru said pilot valve to connect said filter chamber with said diaphragm chamber, a restricted portion in said passageway, a pin secured to said stationary housing and extending into said restricted portion of the passageway, a spring acting between said housing and said pilot valve, a jet chamber, a passageway connecting said diaphragm chamber with said jet chamber, and means in said jet chamber to control flow of liquid through the last mentioned passageway.

34. A relay for regulators comprising a stationary housing, a supply chamber, a discharge chamber, a central chamber adapted for connection with a member to be controlled, an opening between said supply chamber and said central chamber, an opening between said discharge chamber and said central chamber, a pilot valve extending through said openings, said openings constituting seats for said pilot valve, grooves in said pilot valve adapted to effect communication between the supply chamber and the central chamber upon movement of the pilot valve in one direction and to effect communication between said central chamber and said discharge chamber upon movement of the pilot valve in the opposite direction, a filter chamber, a filter between said filter chamber and said supply chamber, said filter being attached to said pilot valve and attached to said stationary housing, a diaphragm chamber, a diaphragm separating said discharge chamber from said diaphragm chamber, said diaphragm being secured to said pilot valve and secured to said stationary housing, a longitudinal passageway extending through said pilot valve to connect said filter chamber with said diaphragm chamber, a restricted portion in said passageway, a pin secured to said stationary housing and extending into said restricted portion of the passageway, a spring acting between said housing and said pilot valve, a jet chamber, a passageway connecting said diaphragm chamber with said jet chamber, a lever in said jet chamber to control flow of liquid through the last mentioned passageway, point bearings for said lever, a spring acting between said lever and said stationary housing, a bellows operating to move said lever, a recess and a pressure chamber formed between said bellows and said recess.

35. A relay for regulators comprising a stationary housing, a supply chamber, a discharge chamber, a central chamber adapted for connection with a member to be controlled, an opening between said supply chamber and said central chamber, an opening between said discharge chamber and said central chamber, a pilot valve extending through said openings, said openings constituting seats for said pilot valve, grooves in said pilot valve adapted to effect communication between the supply chamber and the central chamber upon movement of the pilot valve in one direction and to effect communication between said central chamber and said discharge chamber upon movement of the pilot valve in the opposite direction, a filter chamber, a filter between said filter chamber and said supply chamber, said filter being attached to said pilot valve and attached to said stationary housing, a diaphragm chamber, a diaphragm separating said discharge chamber from said diaphragm chamber, said diaphragm being secured to said pilot valve and secured to said stationary housing, a longitudinal passageway extending through said pilot valve to connect said filter chamber with said diaphragm chamber, a restricted portion in said passageway, a pin secured to said stationary housing and extending into said restricted portion of the passageway, a spring acting between said housing and said pilot valve, a jet chamber, a passageway connecting said diaphragm chamber with said jet chamber, a lever in said jet chamber to control flow of liquid through the last mentioned passageway and means to operate said lever.

36. A relay for regulators comprising a stationary housing, a supply chamber, a discharge chamber, a central chamber adapted for connection with a member to be controlled, an opening between said supply chamber and said central chamber, an opening between said discharge chamber and said central chamber, a pilot valve extending through said openings, said openings constituting seats for said pilot valve, grooves in said pilot valve adapted to effect communication between the supply chamber and the central chamber upon movement of the pilot valve in one direction and to effect communication between said central chamber and said discharge chamber upon movement of the pilot valve in the opposite direction, a filter chamber, a filter between said filter chamber and said supply chamber, said filter being attached to said pilot valve and attached to said stationary housing, a diaphragm chamber, a diaphragm separating said discharge chamber from said diaphragm chamber, said diaphragm being secured to said pilot valve, and secured to said stationary housing, a longitudinal passageway extending through said pilot valve to connect said filter chamber with said diaphragm chamber, a restricted portion in said passageway, a pin secured to said stationary housing and extending into said restricted portion of the passageway, a spring acting between said housing and said pilot valve, a jet chamber, a passageway connecting said diaphragm chamber with said jet chamber, a lever in said jet chamber to control flow of liquid through the last mentioned passageway, point bearings for said lever, a spring acting between said lever and said stationary housing and means to operate said lever.

37. A relay for regulators comprising a stationary housing, a supply chamber, a discharge chamber, a central chamber adapted for connection with a member to be controlled, an opening between said supply chamber and said central chamber, an opening between said discharge chamber and said central chamber, a pilot valve extending through said openings, said openings constituting seats for said pilot valve, grooves in said pilot valve adapted to effect communication between the supply chamber and the central chamber upon movement of the pilot valve in one direction and to effect communication between said central chamber and said discharge chamber upon movement of the pilot valve in the opposite direction, a filter chamber, a filter between said filter chamber and said supply chamber, said filter being attached to said pilot valve and attached to said stationary housing, a diaphragm chamber, a diaphragm separating said discharge chamber from said diaphragm chamber, said diaphragm being secured to said pilot valve and secured to said stationary housing, a longitudinal passageway extending through said pilot valve to connect said filter chamber with said diaphragm chamber, a restricted portion in said passageway, a pin secured to said stationary housing and extending into said restricted portion of the passageway, a spring acting between said housing and said pilot valve, a jet chamber, a passageway connecting said diaphragm chamber with said jet chamber, a lever in said jet chamber to control flow of liquid through the last mentioned passageway, point bearings for said lever, a spring acting between said stationary housing and said lever, a central pin in said lever and means to move said central pin.

38. A relay for regulators comprising a stationary housing, a supply chamber, a discharge chamber, a central chamber adapted for connection with a member to be controlled, an opening between said supply chamber and said central chamber, an opening between said discharge chamber and said central chamber, a pilot valve extending through said openings, said openings constituting seats for said pilot valve, grooves in said pilot valve adapted to effect communication between the supply chamber and the central chamber upon movement of the pilot valve in one direction and to effect communication between said central chamber and said discharge chamber upon movement of the pilot valve in the opposite direction, a filter chamber, a filter between said filter chamber and said supply chamber, said filter being attached to said pilot valve and attached to said stationary housing, a diaphragm chamber, a diaphragm separating said discharge chamber from said diaphragm chamber, said diaphragm being secured to said pilot valve and secured to said stationary housing, a longitudinal passageway extending through said pilot valve to connect said filter chamber with said diaphragm chamber, a restricted portion in said passageway, a pin secured to said stationary housing and extending into said restricted portion of the passageway, a spring acting between said housing and said pilot valve, a jet chamber, a passageway connecting said diaphragm chamber with said jet chamber, a lever in said jet chamber to control flow of liquid through the last mentioned passageway, point bearings for said lever, a spring acting between said stationary housing and said lever, a central pin in said lever and means to move said central pin, said spring acting on said lever at a point intermediate said central pin and said point bearings.

In testimony whereof I hereunto affix my signature.

RAGNAR CARLSTEDT.